United States Patent
Rogers et al.

(10) Patent No.: US 8,209,528 B2
(45) Date of Patent: Jun. 26, 2012

(54) METHOD AND SYSTEM FOR CERTIFYING A CIRCUIT CARD LACKING ANY NON-VOLATILE MEMORY AS BEING COMPATIBLE WITH A COMPUTER

(75) Inventors: John Geoffrey Rogers, San Diego, CA (US); Daniel Lewis, San Diego, CA (US); Steven F. Harris, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 491 days.

(21) Appl. No.: 12/431,075

(22) Filed: Apr. 28, 2009

(65) Prior Publication Data

US 2010/0274998 A1    Oct. 28, 2010

(51) Int. Cl.
*G06F 15/177* (2006.01)
*G06F 3/00* (2006.01)
*H05K 7/10* (2006.01)

(52) U.S. Cl. ............................... 713/2; 710/10; 710/301
(58) Field of Classification Search ........................ 713/2
See application file for complete search history.

(56) References Cited

U.S. PATENT DOCUMENTS

| | | | |
|---|---|---|---|
| 5,038,320 A * | 8/1991 | Heath et al. ..................... | 710/10 |
| 5,235,639 A | 8/1993 | Chevalier et al. | |
| 5,491,804 A * | 2/1996 | Heath et al. ...................... | 710/7 |
| 5,930,496 A * | 7/1999 | MacLaren et al. .............. | 703/23 |
| 6,272,560 B1 | 8/2001 | Kenton et al. | |
| 7,072,728 B2 * | 7/2006 | Montano et al. ................ | 700/97 |
| 7,522,614 B1 * | 4/2009 | Aguinaga et al. ............. | 370/401 |
| 2008/0005372 A1 | 1/2008 | Bolen et al. | |
| 2010/0169530 A1 * | 7/2010 | Guo ............................. | 710/301 |

FOREIGN PATENT DOCUMENTS

WO    WO9933243 A1    7/1999

OTHER PUBLICATIONS archive.org—wayback machine: "Searched for http://damien.bergamini.free.fr/ipw/faq.html", XP002613604, Retrieved from the Internet: URL:http://web.archive.org/web/*re_/http:/ /damien.bergamini.free.fr / ipw/faq.html [retrieved on Dec. 9, 2010].
Damien Bergamini: "Intel® PRO/Wireless . . . native drivers for *BSD", FreeBSD Aug. 16, 2008, XP002613603, Retrieved from the Internet: URL:http://web.archive.org/web/20070816104 601/http://damien.bergamini.free.fr/ipw/faq.html [retrieved on Dec. 9, 2010] Question "What hardware does these drivers support?" Question "What is a firmware?".
International Search Report and Written Opinion—PCT/US2010/032765, International Search Authority—European Patent Office—Dec. 27, 2010.

* cited by examiner

*Primary Examiner* — Suresh Suryawanshi
(74) *Attorney, Agent, or Firm* — James T. Hagler

(57) ABSTRACT

Systems and methods for confirming that a circuit card is compatible with a computer in which it is installed includes accessing a list of compatible circuit cards stored in the computer's nonvolatile memory, determining if the circuit card is included in the list of compatible circuit cards; and storing operating software on the circuit card only if the circuit card is included in the list of compatible circuit cards. The list of compatible circuit cards can be the Plug-and-Play Identification (PnP ID) list stored in the computer's BIOS data. Power may be removed from the circuit card if the circuit card is not include in the list of compatible circuit cards.

20 Claims, 6 Drawing Sheets

METHOD AND SYSTEM FOR CERTIFYING A CIRCUIT CARD LACKING ANY NON-VOLATILE MEMORY AS BEING COMPATIBLE WITH A COMPUTER

FIELD OF THE INVENTION

The present invention relates generally to computer systems, and more particularly to methods for ensuring component circuit cards run only on an approved computing device.

BACKGROUND

Modern personal computers, including notebook computers, employ a number of plug-in modules or cards for providing networking and communication capabilities. For example, notebook computers are typically assembled and sold to consumers including a built-in wireless (e.g., WiFi transceiver) communication card. In the future, notebook computers may be manufactured including a cellular network communication card. Such communication cards include embedded memory used for programming the functionality of the communication card itself. Thus, in addition to providing communication functionality, such communication cards also are embedded data cards.

The U.S. Federal Communication Commission (FCC) regulates the telecommunication industry, including specific rules for intentional and non intentional radiating equipment. In particular, the FCC has issued regulations governing cellular and PCS communication systems which includes requirements for devices such as cellular or PCS external or embedded data cards used with notebook computers. FCC regulations are intended to protect consumer health and minimize interference with other electronic equipment or licensed radio services. Before a transmitter can be sold within the United States, the transmitter manufacturer must obtain authorization from the FCC by demonstrating compliance with the relevant sections of Title 47 of the Code of Federal Regulations.

Beyond requiring certification of transmitter components, the FCC also requires computers and components to confirm that installed components have been certified for the computer. Such a compatibility determination ensures that radio transmission functionality is only enabled with components that have been tested and shown to be compatible with a particular model computer. This regulation protects against consumers inadvertently installing a circuit card or other component into a computer for which it has not been tested, which could lead to violations of FCC product certification requirements. Thus, WWAN module vendors are required to configure their computer products to perform a compatibility determination for each installed component.

Traditionally, computer manufacturers have included a routine in the BIOS (basic input/output) which confirms that every component circuit card, such as an embedded data card or communication card, within the computer has been certified for use with the computer before it is enabled. FIG. 1 illustrates a typical method used by computer manufactures to confirm that a component circuit card connected to the computer is certified for use with the computer prior to being enabled. In overview, the BIOS routine may provide power to the card, step 1, in order to obtain its identification (ID) number, step 3. This card's Plug-and-Play Identification ("PnP ID") number is typically assigned to a particular model card by the card manufacturer and is stored in a nonvolatile memory register on the card. Generally, the card ID includes a number identifying the manufacturer, known as a vendor ID (VID), and a number identifying the particular model or product, known as a product ID (PID). Together, the vendor ID and product ID, referred to herein as a PNP ID, is a number globally unique to a particular FCC certified product.

The BIOS routine then compares the PNP ID number received from the card to a list of numbers authorized for use with the computer, step 5. This PNP ID list is normally stored in the computer's nonvolatile memory (e.g. electronically programmable read-only memory—EPROM) along with the BIOS software. If the card PNP ID number is on the computer's PNP ID list, test 7, then power is applied to the card and the card is enabled to begin operation, step 11. However, if the card PNP ID number is not on the computer's PNP ID list (i.e., test 7="no"), then the BIOS disables or removes power to the card, step 9. FCC regulations require that this process be performed prior to enabling the transmitter of a card at every cold power up. In this manner, if a communication card is installed in a computer for which it has not been certified, the computer will not enable the card, thereby ensuring that the card will not radiate any intentional emissions.

The FCC further requires that component circuit cards with wireless transmitters themselves perform a compatibility test to ensure that they are only used in the computers for which they have been certified. Thus, the component manufacturers must now include compatibility testing as part of the functionality of component circuit cards. By requiring each component circuit card to confirm it is connected to a computer for which it is certified, the FCC regulation further protects consumers in the event a computer manufacturer neglects to include the BIOS routine described above. FIG. 2 illustrates an example method used by circuit card manufacturers to comply with this FCC requirement. When power is applied to the circuit card, step 13, the circuit card accesses the computer's PNP ID list from the computer' BIOS EPROM, step 15. The circuit card then checks the received PNP ID list to see if an entry matches the card's PNP ID, step 17. If the circuit card is included in the PNP ID list, test 19, the circuit card continues with operations, step 23. However, if the circuit card is not included in the computer's PNP ID list (i.e., test 19="no"), the circuit card shuts down, step 21.

The method for complying with the FCC regulations described above and illustrated in FIG. 2 requires nonvolatile memory and software stored on the circuit card dedicated to complying with this compatibility test requirement. This undesirably adds to the complexity and cost of the circuit card.

SUMMARY

Various embodiment systems and methods are disclosed which confirm that the circuit card has been certified for a particular computer as part of the circuit card's software download application stored on the computer's hard drive and executed by the computer's processor. By offloading the card-to-computer compatibility testing to the computer's processor and software maintained on the computer's hard drive, the various embodiments enable FCC compliant circuit cards that are less complex and more affordable.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term "computer" refers to any form of computing device, including in particular notebook computers and portable computing devices. As used herein, the terms "card", "circuit card", and "embedded data card" refer to a circuit component that can be included in a computer system to provide a particular transmitter functionality and for which separate FCC certification is required. A card may be in the form of a single integrated circuit, a chipset or a circuit card containing a number of integrated circuits and circuit elements which may be stalled in a computer system. In a preferred embodiment, the card is a communication card, such as a wireless transceiver or a cellular network transceiver, which when installed enables a computer to communicate with an external wireless network. However, the various embodiments apply to any circuit element in which card authentication must be confirmed and operating software must be downloaded to the circuit element in order for it to function.

Figure 1:
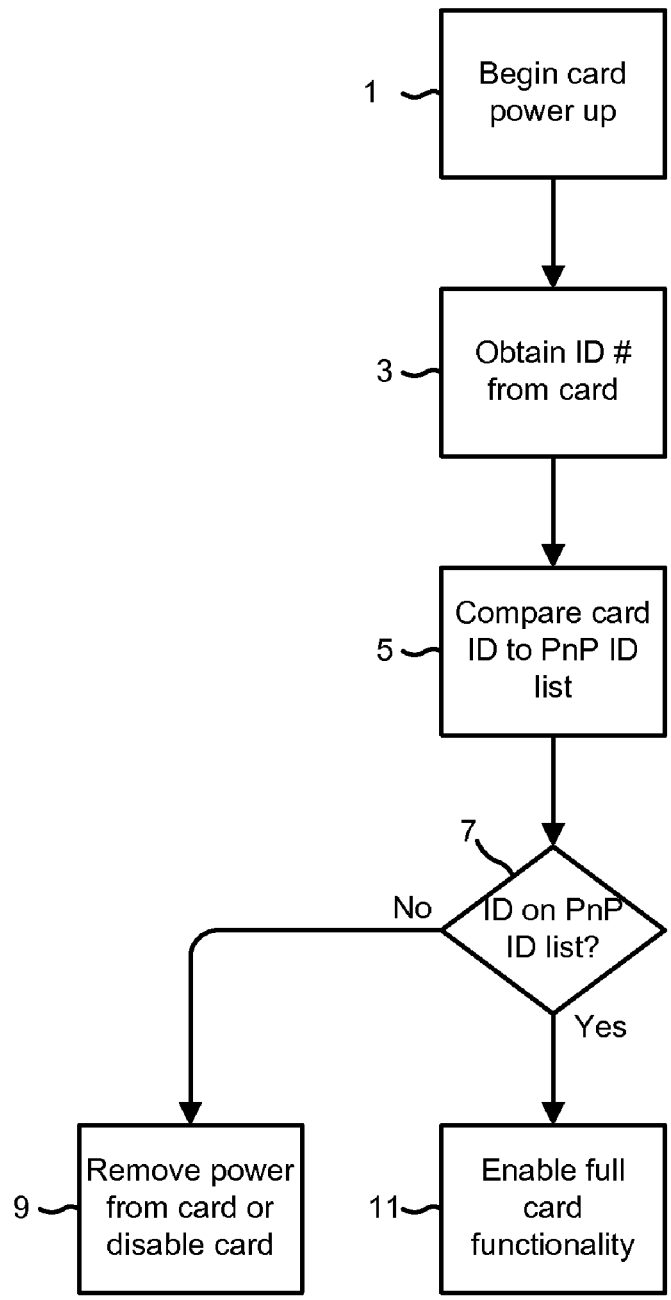
FIG. 1 is a process flow diagram of a prior art method for a computer to ensure a circuit card is certified for use in the computer.
Figure 2:
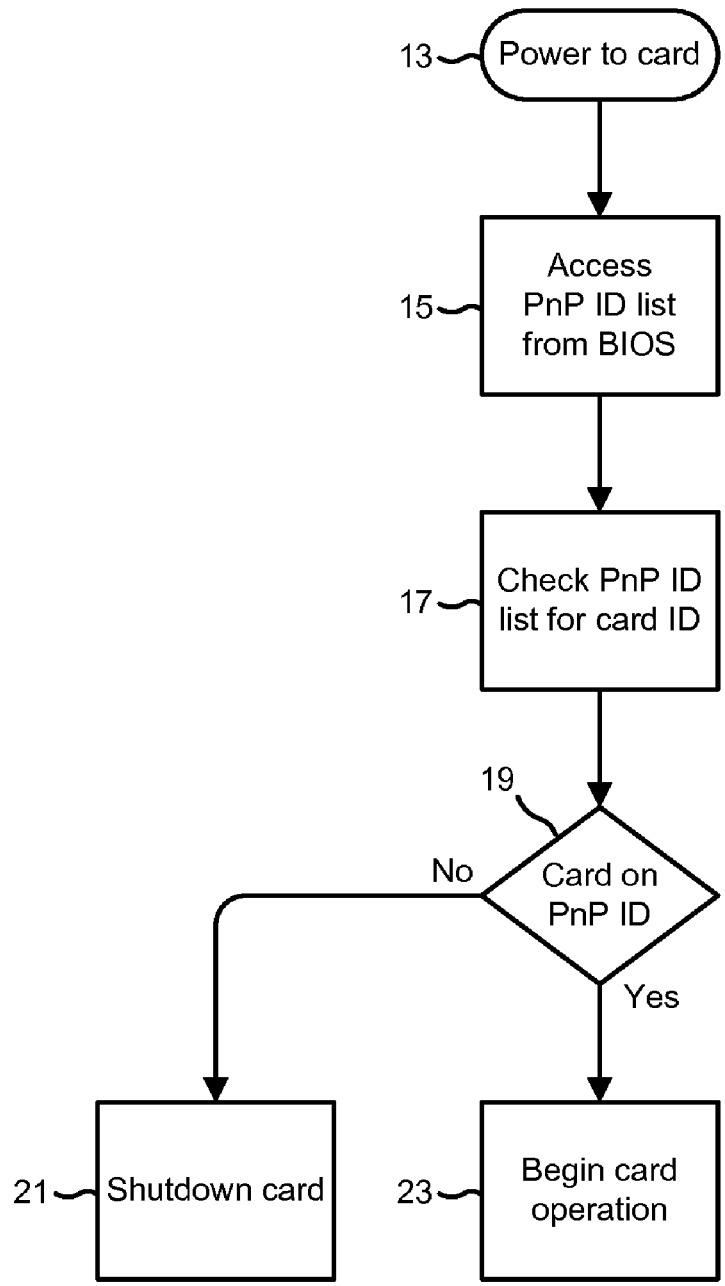
FIG. 2 is a process flow diagram of a prior art method for a circuit card to ensure that it is certified for use in a host computer.

The recent FCC regulation requiring circuit cards to confirm their own certification for use within a host computer if the consumer can purchase the module and install after the notebook has been purchased can impact the design of the circuit card affecting their cost and complexity. Performing the certification confirmation in the circuit card, such as described above with reference to FIG. 2, requires the circuit card to include nonvolatile memory storing operating software for performing this testing. In the vast majority of applications, this testing is unnecessary because the circuit cards are installed by the computers' original equipment manufacturer (OEM). The OEM is unlikely to install an improper circuit card during assembly and the FCC does not require the card manufacture to demonstrate an authentication process if only the OEM can install the card. Also, most consumers do not modify their computers after purchase by installing new or replacement circuit cards. Thus, in the vast majority of cases the confirmatory testing is unnecessary and including the compatibility testing capability within the circuit card requires nonvolatile memory and operating software complexity (and thus added cost) that is of little use in the vast majority of situations.

In order to comply with the FCC requirements while minimizing the complexity of the circuit card, the various embodiments described herein shift the compatibility testing to software which runs on the computer processor as part of the initialization process of loading operating software from the computer's hard disk onto the circuit card. In this manner, the circuit card need not include nonvolatile memory, nor store software instructions for performing the compatibility testing.

Many circuit cards used in modern computer systems include their own onboard processor which must be configured with software instructions in order for the circuit card to function. Examples of such processor-equipped circuit cards include wireless telecommunication cards (e.g., WiFi and cellular network transceiver cards) and GPS receiver cards. Such circuit cards typically include a processor that is configured with operating software and random access memory for storing the software instructions as well as data. Such circuit cards are not able to function without being programmed with their own operating software. Some circuit cards include nonvolatile memory that stores the operating software instructions used to program its onboard processor. However, some circuit cards require the operating instructions to be loaded to nonvolatile memory on the circuit card in order to program its onboard processor. A circuit card that uses volatile memory and is programmed by software stored on the computer's hard drive can be made less expensive and can easily be upgraded by distributing new operating software to consumers (e.g., by providing software updates via the Internet). Thus, before such a circuit card can function, an initializing software routine (referred to herein as a "circuit card initialization software routine") running on the host computer must download the circuit card's operating software to the circuit card's volatile memory. Such circuit card initialization software may be part of the host computer's boot routine, one of the software applications that is run during start up, or part of a component driver software, all of which are well known in the computer arts.

Figure 3:
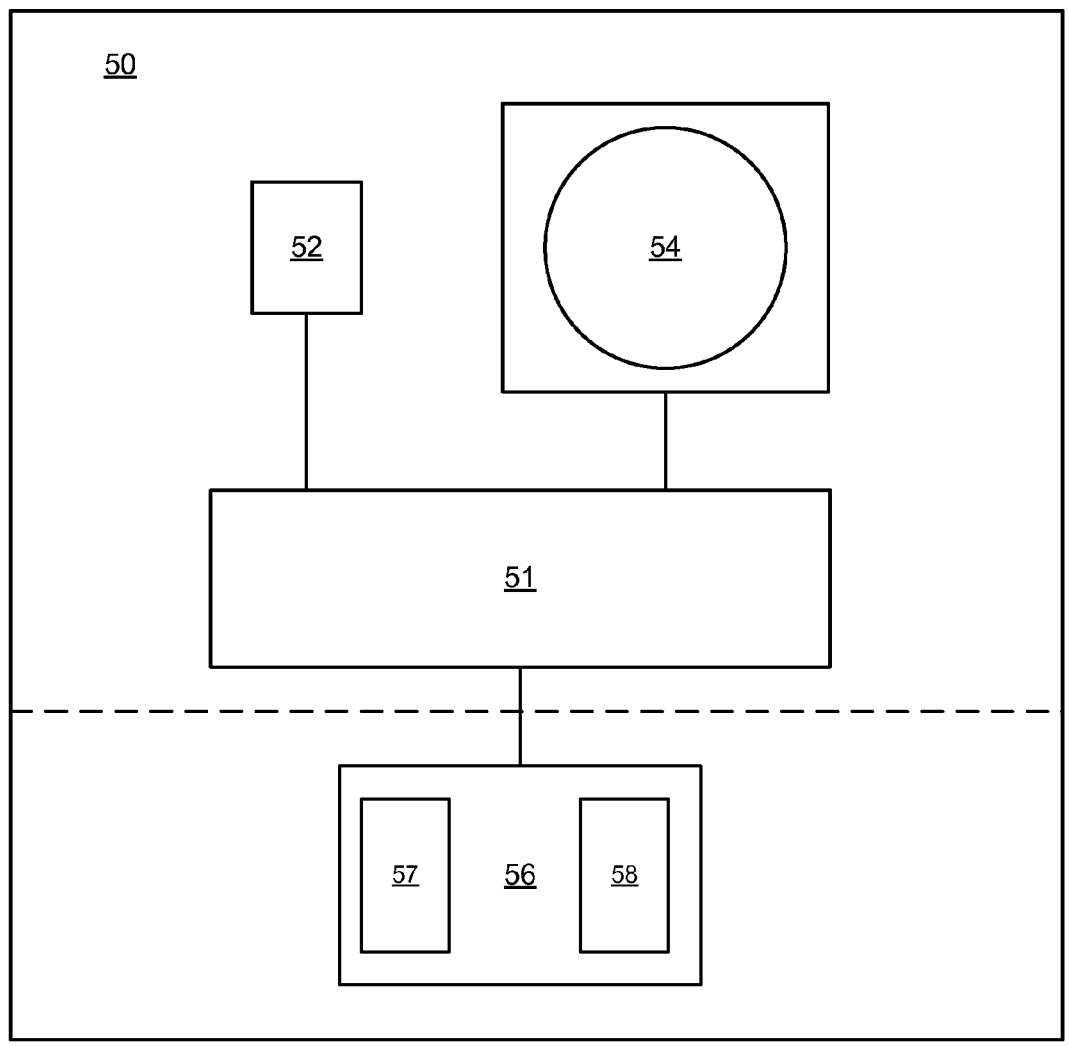
FIG. 3 is a system block diagram of a typical computer suitable for use in an embodiment.

The various embodiments may be implemented on a variety of computer systems and computer architectures. FIG. 3 is a component diagram of the basic elements of a computer system 50 that may implement the various embodiments. As illustrated in FIG. 3, a typical computer 50 will include a processor 51, such as a microprocessor or microcomputer, nonvolatile memory 52, such as an EPROM, hard disk memory 54, and a circuit card 56.

The circuit card 56 may be any of a variety of circuit cards, integrated circuit chips, circuit boards or component devices subject to FCC compatibility testing requirements. The circuit card 56 may include a volatile memory 57 and card processor 58 which is programmed by operating software instructions stored in the volatile memory 57. The card processor 58 must be provided with operating parameters and/or programmed with at least some operating software stored on the computer's hard disk memory 54. The circuit card 56 may be included within the computer 50 as an integral component card, or may be an external component, such as an external modem, as illustrated by the dashed line.

Figure 4:
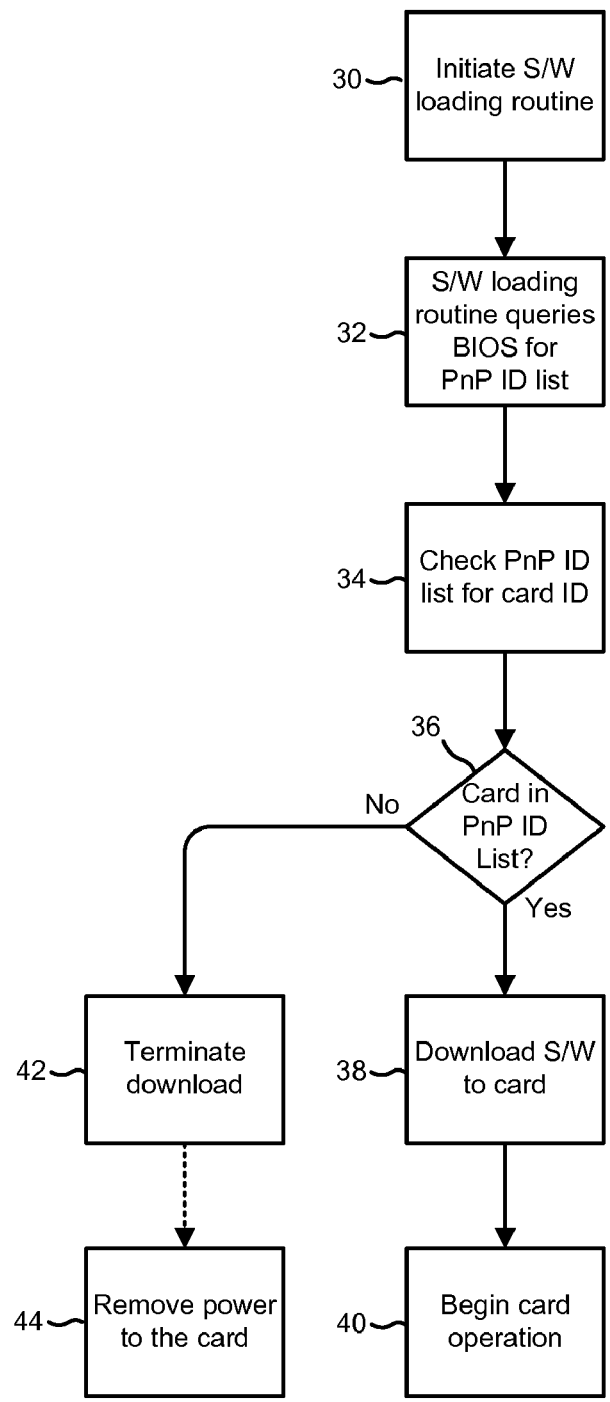
FIG. 4 is a process flow diagram of an embodiment.
Figure 5:
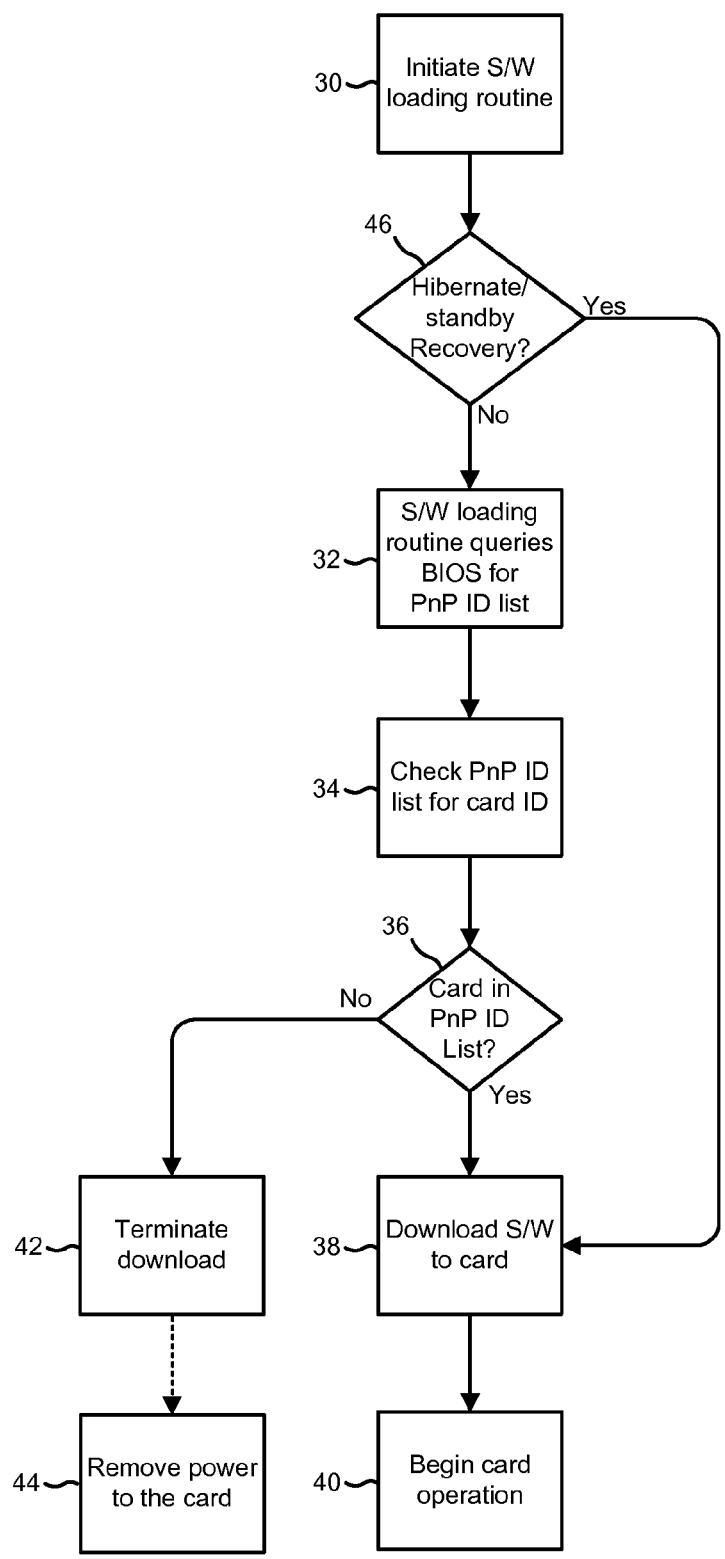
FIG. 5 is a process flow diagram of an alternative embodiment.
Figure 6:
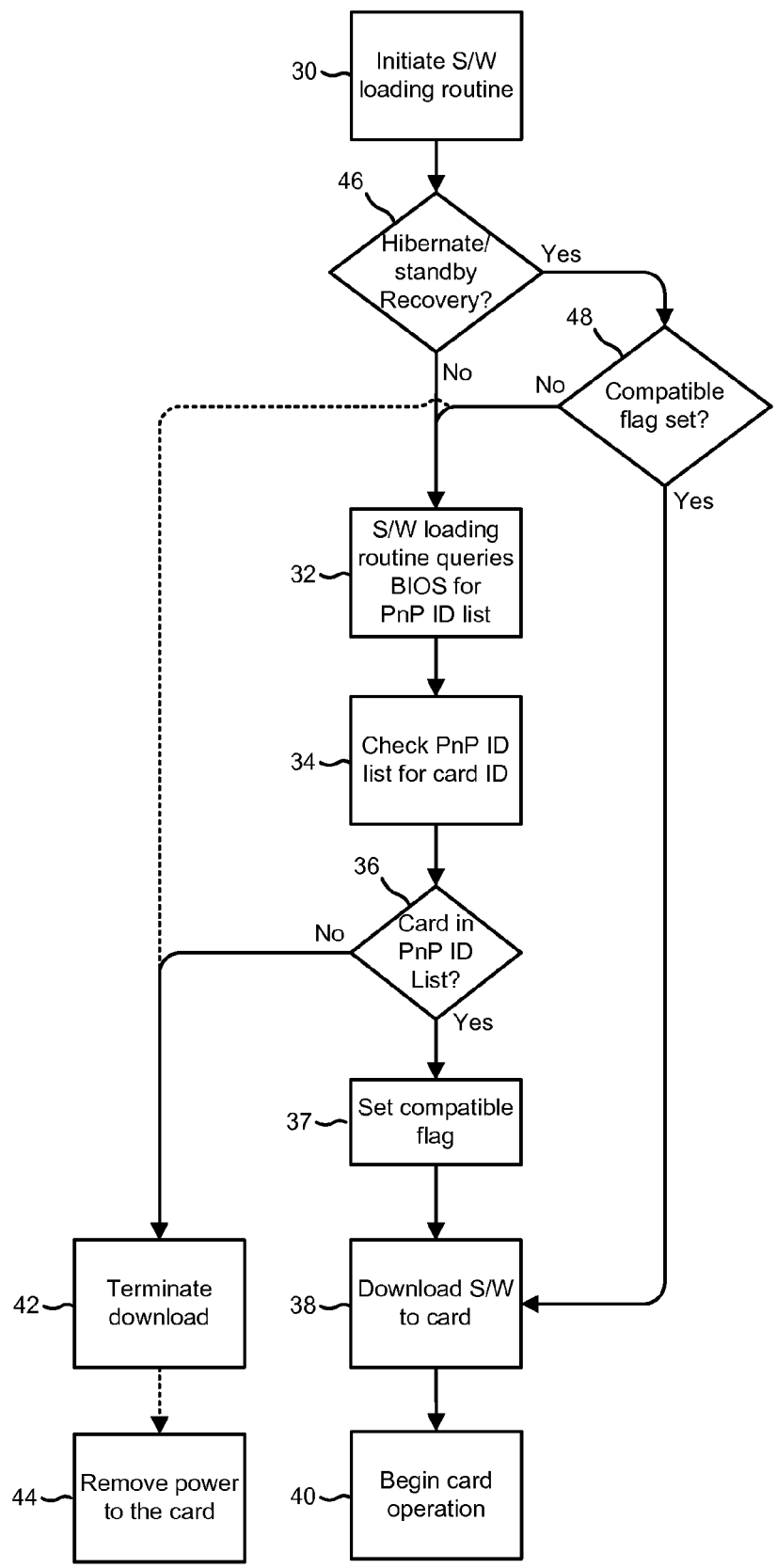
FIG. 6 is a process flow diagram of an alternative embodiment.

At initial startup (i.e., a cold start up), the computer processor 51 can be initially configured with BIOS software and configuration data stored on the nonvolatile memory 52. As part of the startup sequence, the computer processor 51 will be configured with software instructions downloaded from the computer's hard disk memory 54. In the various embodiments, the software instructions downloaded to the computer processor 51 includes a circuit card initialization software routine stored on the hard disk 54. The circuit card initialization software routine causes the processor 51 to perform steps of the various embodiment methods, as well as load operating data and/or software instructions to the circuit card's volatile memory 57 which the card processor 58 needs to perform its functions. In particular, as is described in more detail below, the computer processor 51 can be configured with software instructions stored on the hard disk memory 54 to access the computer's PNP ID list stored in the computer's nonvolatile memory 52 to determine whether the circuit card 56 is compatible with the computer 50. Additionally, the computer processor 51 may also access other information related to the circuit card 56, such as manufacturing strings, system IDs, etc. that are useful for determining compatibility of a circuit card with a notebook system. If the compatibility test described in more detail below with reference to FIGS. 4-6 is successful, the processor 51 can download circuit card operating software from the hard disk 54 to nonvolatile memory 57 in the circuit card 56. Once so programmed, the circuit card processor 58 can perform the functions of the circuit card 56.

In the various embodiments, the circuit card initialization software routine operating on the computer's processor 51 causes the processor 51 to perform the circuit card compatibility testing prior to downloading the circuit card's operating software. The circuit card initialization software routine will typically be stored on the computer's hard drive memory 54 at the time the corresponding circuit card is installed. For example, if the circuit card 56 is installed in the computer 50 by the OEM, the OEM will ensure that it has the appropriate circuit card initialization software routine stored on hard disk memory 54 provided with the computer 50. If the circuit card 56 is sold as an after-market product that consumers may purchase and install themselves, the product package may include a tangible storage medium, such as a compact disk, that the consumer can insert into the corresponding recorder (e.g., a compact disk drive (not shown)) to upload the circuit card initialization software routine prepare to the computer's hard drive memory 54. Alternatively, consumers may be prompted to download the circuit card initialization software routine from the Internet. In some applications the circuit card initialization software routine may be stored in nonvolatile memory 52 (such as FLASH memory) instead of a hard drive memory 54, such as in mobile devices that employ electronic memory rather than magnetic disc memory (e.g., cellular telephones, PDAs, etc.).

In an embodiment, there is a specific circuit card initialization software routine included on the computer's hard disk memory 54 for each circuit card 56 installed on the computer 50. In another embodiment, the computer 50 may execute a generic circuit card software installation routine that is able to the perform circuit card compatibility test of the embodiments described below using a PNP ID number stored on the hard disk memory 54 for each circuit card to be tested. In this manner, the compatibility test can be completed without the need to first energize the circuit card 56 or to include non-volatile memory or circuitry on the circuit card 56 that can provide its ID to the computer's processor 51.

FIG. 4 illustrates an example process flow diagram of an embodiment. During the computer initialization routine, sometimes referred to as the "boot" routine, the circuit card initialization software routine will be activated, step 30. This routine may be called as part of the computer's BIOS process. Before beginning to download software to the circuit card 56, the circuit card initialization software routine causes the computer's processor 51 to query the computer's PNP ID list, step 32. This may be accomplished by the processor 51 accessing the PNP ID list from the computer's BIOS EPROM memory 52. For example, the PNP ID list may be accessed using a standard Microsoft call for the BIOS information.

Having received the PNP ID list, circuit card initialization software routine causes the processor 51 to check the PNP ID list for the PNP ID of the circuit card 56, step 34. To do this, the circuit card initialization software routine may recall the circuit card's ID from a data field stored on the computer's hard disk memory 54. Alternatively, the circuit card's ID may be programmed within the code of the compatibility test software routine. If the circuit card is listed on the computer's PNP ID list, test 36, the circuit card initialization software routine proceeds to download the operating software to the circuit card, step 38. Once the circuit card has been programmed, the circuit card can begin normal operation, step 40. However, if the circuit card initialization software routine determines that the circuit card is not listed on the computer's PNP ID list (i.e., test 36="no"), then the circuit card operating software download may be terminated, step 42. This leaves an uncertified card (i.e., a card that is not certified or otherwise listed on the PNP ID list) stuck in the software download stage prior to being enabled or activated. In an embodiment, circuit card initialization software routine may also cause the processor to remove power to the circuit card in the event that the circuit card's ID is not listed on the computer's PNP ID the list, step 44.

Since the circuit card's operating software will be deleted from the circuit card's volatile memory whenever the circuit card 56 is de-energized, this embodiment necessarily complies with the FCC's requirement for circuit card authentication at cold power up. Since the circuit card 56 will not run without its operating software, even if the compatibility test is not performed, the circuit card 56 will not operate.

The timing of the compatibility test within the computer's initialization routine can vary depending upon the manufacturer's preferences. For example, the circuit card initialization software routine may run whenever the computer 50 itself is started (i.e., from a cold power up). In this manner, the circuit card 56 will be checked and activated as part of the computer's overall startup sequence. Alternatively, the circuit card initialization software routine may be run when the circuit card 56 is activated, such as when a user elects to activate a particular functionality. For example, if a computer 50 is configured so that wireless communication cards are not activated (e.g., settings appropriate for using the computer on a commercial airline), then the compatibility test need not be performed. However, if a user subsequently elects to activate the computer's wireless communication capability, the circuit card initialization software routine would be activated causing the compatibility test to be run at that time.

An alternative embodiment is illustrated in FIG. 5 which may be implemented in computer systems which include "hibernate" or "standby" partial operating modes. In a hibernate or standby mode, the computer 50 is left in a state from which a rapid restart is possible. In some embodiments, power may continue to be supplied to some memory modules in order to maintain software and/or data in memory. Since the FCC only requires that the compatibility tests to be performed every time the computer 50 performs a cold power up, there is no regulatory need to perform the steps of the process described above with reference to FIG. 4. Referring to FIG. 5, the circuit card initialization software routine may be activated, step 30, when the computer is returned to normal operation from standby or hibernate conditions. In this embodiment, the circuit card initialization software routine may first cause the computer's processor 51 to determine if the instant start up process is a recovery from either a hibernate or standby condition, test 46. This may be accomplished by testing a flag in memory indicating the type of start up that is underway. If the start up is part of a cold power up (i.e., test 46="no"), the process may continue in the manner described above with reference to FIG. 4, steps 32-44. However, if the circuit card initialization software routine has been activated as part of a recovery from a hibernate or standby condition (i.e., test 46="yes"), the software routine may cause the computer processor 51 to jump to the step of downloading operating software to the circuit card 56, step 38.

The embodiment illustrated in FIG. 5 may permit a more rapid restart from any hibernate or standby condition by eliminating the need to perform the compatibility test. Since the compatibility test need only be conducted when a cold power up is conducted, this embodiment complies with the FCC requirements. Some additional steps may also be included to ensure an incompatible circuit card is not energized following restart from a hibernate or standby condition.

In a further embodiment illustrated in FIG. 6, the circuit card initialization software routine may also include a test 48 of a flag variable stored in the computer's memory (e.g., 52 or 54) that is maintained during hibernate or standby states that indicates whether the prior conduct of the circuit card compatibility test was successful. This compatibility flag may be set if the computer processor 51 determines that the circuit card's ID is listed on the PNP ID list (i.e., test 36="yes"), step 37. This may be accomplished via the processor 51 storing a flag (e.g., "1") in a particular address in the computer's memory to indicate that the circuit card 56 was determined to be compatible. Then, in a subsequent recovery from a hibernate or standby condition, the circuit card initialization software routine may cause the processor to check the flag, test 48, after determining that the circuit card 56 is being initialized after a hibernate or standby condition, test 46. If the compatible flag is set (e.g., equals "1"), the processor 51 may jump to the software download step 38. However, if the compatible flag is not set (i.e., test 48="no"), indicating that the prior compatibility test failed, then the processor 51 may proceed to perform the compatibility test again by executing steps 32-36 as described above with reference to FIG. 4. Alternatively, the processor 51 may proceed to terminate the software download, step 42, and remove power from the circuit card 56, step 44, as indicated by the dashed lines in FIG. 6.

The embodiment illustrated in FIG. 6 ensures that an incompatible circuit card will not be activated even when the computer 50 is recovering from a hibernate or standby condition. This embodiment may also bypass conducting the compatibility test if a prior test is already indicated that the circuit card 56 is not compatible.

The embodiments have a number of advantages. By performing the compatibility test using the computer's processor 51 and software stored on the computer's hard disk memory 54, the circuit card 56 can be made less complex, and thus less expensive. There may be no need for nonvolatile memory on the circuit card 56 (which otherwise would be required to store software instructions for performing the compatibility test), thereby potentially eliminating an expensive component from the design of the circuit card. Even if a nonvolatile memory is part of the circuit card 56 for its other functional purposes, the nonvolatile memory need not be filled with the compatibility test software instructions, leaving more memory available for other card functions. The embodiment also eliminates the complexity associated with providing software in the circuit card 56 which is capable of accessing memory within the computer's BIOS. Since circuit cards may be manufactured for a variety of computers, including computers yet to be designed and built, this advantage of eliminates the challenge of designing circuit card software which can access particular memory in a variety of different computer architectures. In short, the embodiments enabled the circuit card 56 to be simpler and less expensive in design than would otherwise be required to comply with the FCC requirements.

It is noted that storing the circuit card compatibility test software on the computer's hard drive makes it more vulnerable to alteration by users than if the software is embedded within the nonvolatile memory of the circuit card. However, this may not be a concern because the FCC requirements are intended to protect consumers from inadvertently installing an incompatible circuit card in a computer system, and not to defeat concerted efforts to modify or sabotage the computer system. This protects typical consumers rather than protect against hackers. Nevertheless, the circuit card initialization software routine may be encrypted or protected by a digital signature so that the computer processor can detect if the software routine has been modified and prevent operation if it has. Also, the circuit card initialization software routine may be stored in a hidden file or in hidden memory locations on the hard drive in order to make it more difficult for users to locate and modify the software files.

The hardware used to implement the foregoing embodiments may be processing elements and memory elements configured to execute a set of instructions, wherein the set of instructions are for performing method steps corresponding to the above methods. Alternatively, some steps or methods may be performed by circuitry that is specific to a given function.

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The order in which the steps of a method described above and shown in the figures is for example purposes only as the order of some steps may be changed from that described herein without departing from the spirit and scope of the present invention and the claims. The steps of a method or algorithm described in connection with the embodiments disclosed herein may be embodied directly in hardware, in a software module executed by a processor, or in a combination of the two. A software module may reside in processor readable memory which may be any of RAM memory, flash memory, ROM memory, EPROM memory, EEPROM memory, registers, hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor. The processor and the storage medium may reside in an ASIC. The ASIC may reside in a user terminal or mobile device. In the alternative, the processor and the storage medium may reside as discrete components in a user terminal or mobile device. Additionally, in some aspects, the steps and/or actions of a method or algorithm may reside as one or any combination or set of codes and/or instructions on a machine readable medium and/or computer readable medium, which may be incorporated into a computer program product.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

We claim:

1. A computer executed method of confirming that a circuit card which does not have nonvolatile memory or circuitry providing identification information is certified as being compatible for use with a particular model computer without energizing the circuit card, comprising:
    executing circuit card initialization software on a processor of the computer upon each start up of the computer, wherein the circuit card initialization software is stored on a hard disk of the computer;
    accessing a list of certified compatible circuit cards stored in the computer's nonvolatile memory;
    determining if the circuit card is included in the list of certified compatible circuit cards; and
    storing operating software instructions in a volatile memory on the circuit card only when the circuit card is included in the list of certified compatible circuit cards.

2. The computer executed method of claim 1, wherein the list of certified compatible circuit cards is a Plug-and-Play Identification (PnP ID) list stored in the computer's BIOS data.

3. The computer executed method of claim 1, further comprising removing power from the circuit card when the circuit card is not include included in the list of certified compatible circuit cards.

4. The computer executed method of claim 1, further comprising:
    determining when the computer is recovering from a standby or hibernate condition; and
    storing operating software instructions in the volatile memory on the circuit card when the computer is recovering from a standby or hibernate condition without performing the steps of accessing the list of certified compatible circuit cards and determining if the circuit card is included in the list of certified compatible circuit cards.

5. The computer executed method of claim 1, further comprising:
    recovering from a standby or hibernate condition;
    determining if the computer previously determined that the circuit card is included in the list of certified compatible circuit cards; and
    storing operating software instructions in the volatile memory on the circuit card without repeating the steps of accessing of accessing the list of certified compatible circuit cards and determining if the circuit card is included in the list of certified compatible circuit cards when the computer previously determined that the circuit card is included in the list of certified compatible circuit cards.

6. A computer system, comprising:
    a processor;
    a hard disk memory coupled to the processor;
    a nonvolatile memory coupled to the processor, the nonvolatile memory having stored thereon BIOS data and software instructions; and
    a circuit card coupled to the processor, the circuit card including a volatile memory, but lacking any nonvolatile memory or circuitry on the circuit card for providing identification information,
    wherein the hard disk memory has stored thereon processor executable circuit card initialization software instructions configured to cause the processor to perform steps to perform compatibility testing to assure that the circuit card is certified for use with the computer system upon each start up of the computer system comprising:
        accessing a list of certified compatible circuit cards stored in the nonvolatile memory;
        determining if the circuit card is included in the list of certified compatible circuit cards; and
        storing operating software instructions on the volatile memory of the circuit card only when the circuit card is included in the list of certified compatible circuit cards.

7. The computer system of claim 6, wherein the list of certified compatible circuit cards is stored in the computer's BIOS data as a Plug-and-Play Identification (PnP ID) list.

8. The computer system of claim 6, wherein the hard disk memory has stored thereon processor executable software instructions configured to cause the processor to further perform steps comprising removing power from the circuit card when the circuit card is not included in the list of certified compatible circuit cards.

9. The computer system of claim 6, wherein the hard disk memory has stored thereon processor executable software instructions configured to cause the processor to further perform steps comprising:
    determining if the computer is recovering from a standby or hibernate condition; and
    storing operating software instructions on the volatile memory of the circuit card when the computer is recovering from a standby or hibernate condition without performing the steps of accessing the list of certified compatible circuit cards and determining if the circuit card is included in the list of certified compatible circuit cards.

10. The computer system of claim 6, wherein the hard disk memory has stored thereon processor executable software instructions configured to cause the processor to further perform steps comprising:
    determining that the computer is recovering from a standby or hibernate condition;
    determining if the computer previously determined that the circuit card is included in the list of certified compatible circuit cards; and
    storing operating software instructions on the volatile memory of the circuit card without repeating the steps of accessing of accessing the list of certified compatible circuit cards and determining if the circuit card is included in the list of certified compatible circuit cards when the computer previously determined that the circuit card is included in the list of certified compatible circuit cards.

11. A computer configured to confirm that a circuit card coupled to the computer is certified as being compatible for use with the computer upon each start up of the computer, the circuit card including a volatile memory but lacking any nonvolatile memory or circuitry on the circuit card for providing identification information, comprising:

means for accessing a list of certified compatible circuit cards stored in the computer's nonvolatile memory;

means for determining if the circuit card is included in the list of certified compatible circuit cards; and means for storing operating software instructions on the volatile memory of the circuit card only when the circuit card is included in the list of certified compatible circuit cards.

12. The computer of claim 11, wherein the list of certified compatible circuit cards is a Plug-and-Play Identification (PnP ID)list stored in the computer's BIOS data.

13. The computer of claim 11, further comprising means for removing power from the circuit card when the circuit card is not included in the list of certified compatible circuit cards.

14. The computer of claim 11, further comprising:

means for determining if the computer is recovering from a standby or hibernate condition; and means for storing operating software instructions on the volatile memory of the circuit card when the computer is recovering from a standby or hibernate condition without performing the steps of accessing the list of certified compatible circuit cards and determining if the circuit card is included in the list of certified compatible circuit cards.

15. The computer of claim 11, further comprising:

means for determining that the computer is recovering from a standby or hibernate condition;

means for determining if the computer previously determined that the circuit card is included in the list of certified compatible circuit cards; and means for storing operating software instructions on the volatile memory of the circuit card without repeating the steps of accessing the list of certified compatible circuit cards and determining if the circuit card is included in the list of certified compatible circuit cards when the computer previously determined that the circuit card is included in the list of certified compatible circuit cards.

16. A non-transitory processor-readable storage medium having stored thereon processor-executable software instructions configured to cause a processor to perform steps for confirming that a circuit card is certified as being compatible for use with a particular model computer comprising the processor each time the computer starts up without energizing the circuit card or including nonvolatile memory or circuitry on the circuit card for providing identification information, comprising:

accessing a list of certified compatible circuit cards stored in the nonvolatile memory;

determining if the circuit card is included in the list of certified compatible circuit cards; and storing operating software instructions on volatile memory of the circuit card only when the circuit card is included in the list of certified compatible circuit cards.

17. The non-transitory processor-readable storage medium of claim 16, wherein the list of certified compatible circuit cards is stored in the computer's BIOS data as a Plug-and-Play Identification (PnP ID)list.

18. The non-transitory processor-readable storage medium 16, wherein the stored processor executable software instructions are configured to cause the processor to further perform steps comprising removing power from the circuit card when the circuit card is not included in the list of certified compatible circuit cards.

19. The non-transitory processor-readable storage medium 16, wherein the stored processor executable software instructions are configured to cause the processor to further perform steps comprising:

determining if the computer is recovering from a standby or hibernate condition; and storing operating software on the circuit card when the computer is recovering from a standby or hibernate condition without performing the steps of accessing the list of certified compatible circuit cards and determining if the circuit card is included in the list of certified compatible circuit cards.

20. The non-transitory processor-readable storage medium 16, wherein the stored processor executable software instructions are configured to cause the processor to further perform steps comprising:

determining that the computer is recovering from a standby or hibernate condition;

determining if the computer previously determined that the circuit card is included in the list of certified compatible circuit cards; and storing operating software on the circuit card without repeating the steps of accessing of accessing the list of certified compatible circuit cards and determining if the circuit card is included in the list of certified compatible circuit cards when the computer previously determined that the circuit card is included in the list of certified compatible circuit cards.

* * * * *